US011553307B2

(12) United States Patent
Albada et al.

(10) Patent No.: US 11,553,307 B2
(45) Date of Patent: Jan. 10, 2023

(54) HIGH DIMENSION COPRESENCE ESTIMATION SYSTEM

(71) Applicant: Uber Technologies, Inc., San Francisco, CA (US)

(72) Inventors: Michael Charles Albada, San Francisco, CA (US); Dineshkumar Karuppanna Gounder Ramasamy, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 17/302,120

(22) Filed: Apr. 23, 2021

(65) Prior Publication Data

US 2022/0345850 A1    Oct. 27, 2022

(51) Int. Cl.
*H04W 4/029* (2018.01)
*H04W 4/40* (2018.01)
*H04B 17/318* (2015.01)

(52) U.S. Cl.
CPC .......... *H04W 4/029* (2018.02); *H04B 17/318* (2015.01); *H04W 4/40* (2018.02)

(58) Field of Classification Search
None
See application file for complete search history.

(56) References Cited

FOREIGN PATENT DOCUMENTS

| KR | 20140040836 A | * | 4/2014 | ............... G01S 5/12 |
| WO | WO-2021202854 A1 | * | 10/2021 | ......... G06Q 30/0201 |

* cited by examiner

*Primary Examiner* — Adolf Dsouza
(74) *Attorney, Agent, or Firm* — Schwegman Lundberg & Woessner, P.A.

(57) ABSTRACT

A network system receives, from each of a plurality of client devices, a transmission of a scan of signals from signal broadcasting devices. A vector is created from each scan, whereby the vector comprises a received signal strength indicator (RSSI) to each unique signal broadcasting device. Based on the vector created from each scan, the network system determines a probability that the client devices are co-present. The probability is determined based on applying the vectors to a copresence estimation function that uses an angular similarity, a magnitude similarity, and a number of signal broadcasting devices. Based on the probability, the network system triggers a component to perform a corresponding operation.

16 Claims, 5 Drawing Sheets

HIGH DIMENSION COPRESENCE ESTIMATION SYSTEM

TECHNICAL FIELD

The subject matter disclosed herein generally relates to special-purpose machines configured to determine locations of user devices, and to the technologies by which such special-purpose machines become improved compared to other machines that determine locations of user devices. Specifically, the present disclosure addresses systems and methods that provides high dimension copresence estimation for a plurality of user devices.

BACKGROUND

Conventionally, locations of user devices are detected using GPS. However, GPS may not be specific or accurate enough in certain environments. This is especially true in urban areas or urban canyons where high buildings can interfere with satellites. Because GPS may not be accurate on mobile devices, it is not always reliable. Thus, it may be difficult to determine it two user devices are close together or co-located.

BRIEF DESCRIPTION OF THE DRAWINGS

Some embodiments are illustrated by way of example and not limitation in the figures of the accompanying drawings.

DETAILED DESCRIPTION

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Copresence comprises estimating a probability that two entities are co-located or within a predetermined distance threshold of each other that is relatively small (e.g., within 1 meter). In one use case, copresence can be used to determine if a rider and driver are co-located (e.g., in the same vehicle) for a ride sharing service. If the rider and driver are co-located, then a trip (e.g., transportation service from a pickup location to a drop-off location) can start. If the rider and driver are not co-located, example embodiments can help the rider and driver find each other. Conversely, if the rider and driver are no longer co-located after previously being co-located, then the trip is marked as completed, which can be used to resolve fare disputes or automatically end tracking of the trip. In a further use case, copresence can be used to provide a safety notification should a rider get into a wrong vehicle or, conversely, into a correct vehicle. In a delivery use case, copresence can be used to detect that a courier has arrived at their delivery location.

Because GPS may not always be reliable or be accurate, example embodiments provide a more robust system that can provide accurate copresence determination where GPS is not reliable or even available. In example embodiments, a network system uses multiple numbers and types of signals to create a reliable estimate of copresence. This multichannel copresence detection process enables a principled and scalable approach to determine whether two entities are located together using high dimensional multichannel inputs. In various embodiments, WiFi, Bluetooth, cellular (e.g., 5G), and/or ultra-wideband signals can be used. Additionally, example embodiments can easily be extended to new communication protocols that involve large numbers of local devices that emit low-power identifiers.

In various embodiments, the network system is orthogonal to GPS localization and GPS-based copresence detection, although both can be used in tandem. However, multichannel copresence detection enables a greater degree of precision when multiple beacons are nearby, which is likely in complex urban environments. Additionally, multichannel copresence detection can be used to detect copresence across different levels (e.g., different floors or heights) for which GPS copresence detection is ill-suited. Advantageously, multichannel copresence detection is flexible—requiring no pre-training, no large-scale location map, and no set of vectors to index; is constantly "fresh" since it is independent from deployments; and is easy to implement.

Presently, Android exposes Received Signal Strength Indicator (RSSI) and transmitted power (txpower), while iOS exposes RSSI and a distance estimate. Rather than rely on distance calculation APIs offered by mobile device operating systems with opaque and potentially shifting methodologies, example embodiments, rely on core signals measured by each mobile device.

Figure 1:
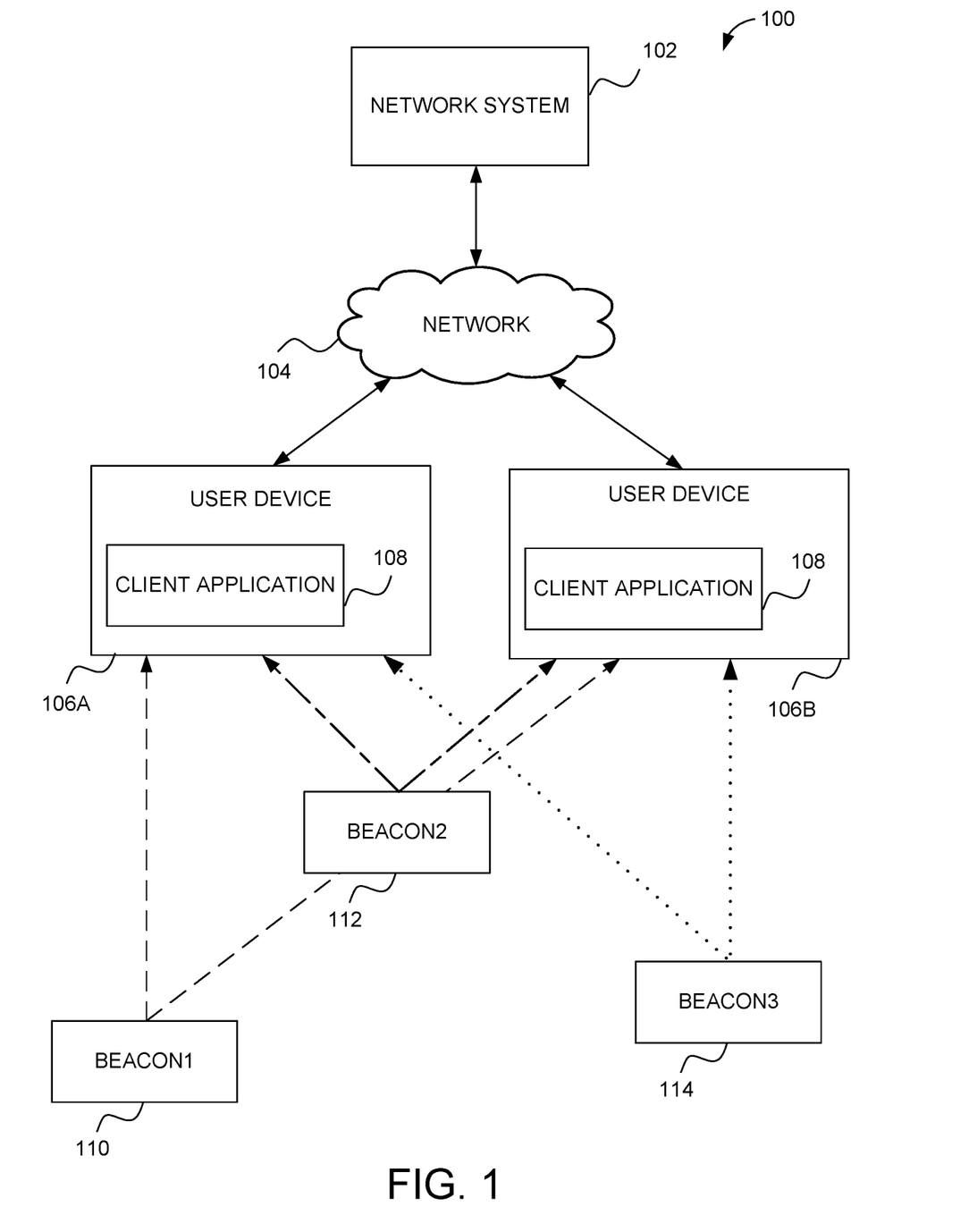
FIG. 1 is a diagram illustrating a network environment suitable for providing high dimension copresence estimation, according to some example embodiments.

FIG. 1 is a diagram illustrating a network environment 100 suitable for providing high dimension copresence estimation, according to some example embodiments. The network environment 100 includes a network system 102 communicatively coupled via a network 104 to a first user device 106a and a second user device 106b (collectively referred to as "user devices 106"). The first user device 106a may be a device of a user or rider for a transportation service, while the second user device 106b is a device of a service provider or driver for the transportation service. In example embodiments, the network system 102 comprises components that obtain and analyze scans received from the user devices 106 to determine copresence of the user devices 106. The components of the network system 102 are described in more detail in connection with FIG. 2 and may be implemented in a computer system, as described below with respect to FIG. 5. While some embodiments are described in the context of a transportation service (e.g., to transport a person), example embodiments may also be used in delivery services (e.g., to deliver an item such as food), whereby the first user device 106a is a device of a recipient and the second user device 106b is a device of a courier.

The components of FIG. 1 are communicatively coupled via the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network 104 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

In example embodiments, the user devices 106 are portable electronic devices such as smartphones, tablet devices, wearable computing devices (e.g., smartwatches), or similar mobile devices. Alternatively, the user device 106b of the service provider can correspond to an on-board computing system of a vehicle. The user devices 106 each comprises one or more processors, memory, touch screen displays, wireless networking system (e.g., IEEE 802.11), cellular telephony support (e.g., LTE/GSM/UMTS/CDMA/HSDPA), and/or location determination capabilities.

The user devices 106 interact with the network system 102 through a client application 108 stored thereon. The client application 108 of the user devices 106 allow for exchange of information with the network system 102 via user interfaces, as well as in background. For example, the client application 108 running on the user devices 106 can scan for signals in their environment, transmit the scan to the network system 102, and receive a notification of copresence (or lack of copresence). In some embodiments, the client application 108 is triggered by the network system 102 to perform the scan. The network system 102 then uses the scans to determine whether the user devices 106 are co-present and triggers a component of the network system 102 to perform a corresponding operation. For example, if the user devices 106 are determined to be co-present (within a predetermined threshold), a notification can be transmitted to each user device 106 indicating the co-presence. Alternatively, if the user devices 106 are determined not to be co-present, a notification can be transmitted, for example, to the first user device 106a indicating that the user got into the wrong vehicle. In some embodiments, the client application 108 is provided by the network system 102.

In example embodiments, a first user (e.g., a requester or rider) operates the first user device 106a that executes the client application 108 to communicate with the network system 102 to make a request for a transportation service such as transport or delivery service (referred to collectively as a "trip"). The client application 108 determines or allows the user to specify/select a pickup location or point (e.g., of the user or an item to be delivered) and to specify a drop-off location or point for the trip. The client application 108 can also present notifications indicating copresence (e.g., "You are in the wrong vehicle;" "You are in the correct vehicle and your trip has begun." "You are moving towards your pick-up vehicle.")

A second user (e.g., a service provider or driver) operates the second user device 106b to execute the client application 108 that communicates with the network system 102 to exchange information associated with providing transportation service (e.g., to the user of the requester device 106a). The client application 108 presents information via user interfaces to the user of the second user device 106b, such as invitations to provide the transportation service, a route and navigation instructions to a pickup point of the user (e.g., rider) or item, and a route and navigation instructions to a drop-off point for the user or item. The client application 108 can also present notifications indicating copresence (e.g., "Your rider is approaching;" "You have arrived at your delivery location."). The client application 108 also provides data to the network system 102 such as a current location (e.g., coordinates such as latitude and longitude), speed, and/or heading of the second user device 106b or vehicle.

The environment 100 also comprises a plurality of beacons 110-114. The beacons 110-114 each provides a signal that may be detected by one, none, or both user devices 106. The beacons 110-114 can be different types of signal broadcasting devices. For example, a first beacon 110 may be a Wi-Fi base station, while a second beacon 112 may be a Bluetooth device, and a third beacon 114 is an ultra-wide band broadcasting device. A further beacon can be a cellular network tower broadcasting a cellular signal (e.g., 5G). Other types of beacons can be used as long as the beacons emit a signal that can be detected by the user devices 106 along with a corresponding signal strength.

In example embodiments, any of the systems or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 5, and such a special-purpose computer may be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or devices illustrated in FIG. 1 may be combined into a single system or device, and the functions described herein for any single system or device may be subdivided among multiple systems or devices. Additionally, any number of user devices 106 may be embodied within the network environment 100, and any number, type, or combination of number and/or types of beacons 110-114 can be embodied within the network environment 100. Furthermore, some components or functions of the network environment 100 may be combined or located elsewhere in the network environment 100.

For example, some of the functions of the networked system 102 may be embodied within other systems or devices of the network environment 100. Additionally, some of the functions of the user device 106 may be embodied within the network system 102. While only a single network system 102 is shown, alternative embodiments may contemplate having more than one network system 102 to perform server operations discussed herein for the network system 102.

Figure 2:
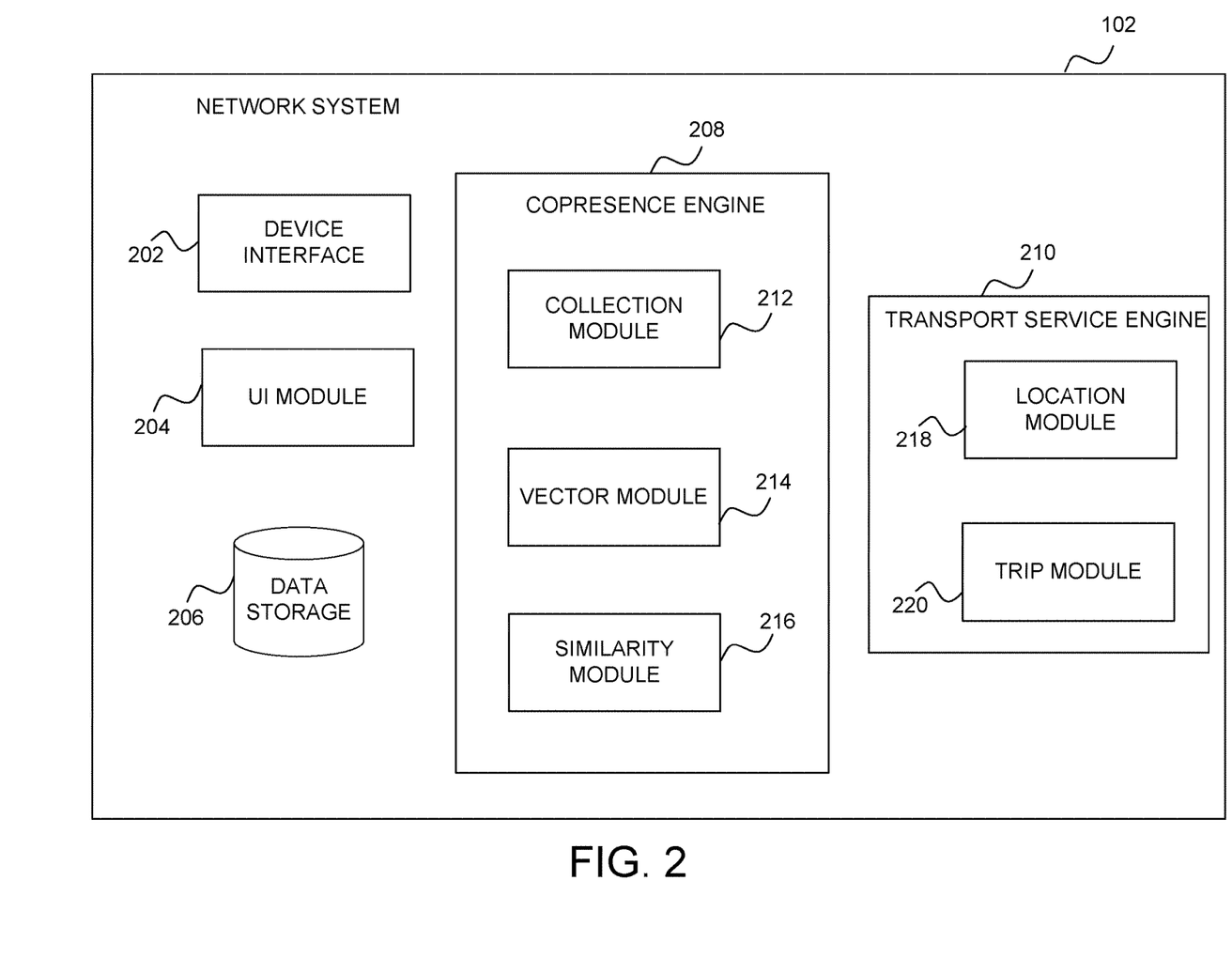
FIG. 2 is a block diagram illustrating components of a network system for providing high dimension copresence estimation, according to some example embodiments.

FIG. 2 is a block diagram illustrating components of the network system 102 for providing high dimension copresence estimation, according to some example embodiments. In various embodiments, the network system 102 receives scans from the user devices 106 and analyzes the scans to determine whether the user devices 102 are co-present. The network system 102 then triggers a component to perform an operation based on whether the user devices 102 are copresent or not. To enable these operations, the network system 102 comprises a device interface 202, an user interface (UI) module 204, a data storage 206, a copresence engine 208, and a transport service engine 210 all configured to communicate with each other (e.g., via a bus, shared memory, or a switch). The network system 102 may also comprise other components (not shown) that are not pertinent to example embodiments. Furthermore, any one or more of the components (e.g., engines, interfaces, modules, storage) described herein may be implemented using hardware (e.g., a processor of a machine) or a combination of hardware and software. Moreover, any two or more of these components may be combined into a single component, and the functions described herein for a single component may be subdivided among multiple components.

The device interface 202 is configured to exchange data with the client devices 106 and cause presentation of one or more user interfaces provided by the UI module 204 on the client devices 106 (e.g., via the client application 108) including user interfaces to initiate a request for transportation service, select a pickup location and drop-off location, and display a route or path to navigate to the pickup location and the drop-off location. In some embodiments, the user interfaces provide an indication of copresence (or lack of copresence) of the user devices 106. The device interface 202 may also receive data including scans and trip data from the client devices 106 before, during, and after a trip. The trip data can include location information such as GPS traces (e.g., latitude and longitude with timestamp), speed, times associated with each trip, and feedback for the transportation service. The scans and trip data may be received from the client device 106 in real-time, for example as the user is traveling (or navigation to a destination) during the trip. The scans and/or trip data are stored to the data storage 206 by the device interface 202.

The data storage 206 is configured to store information associated with each user of the network system 102 including the trip data and a user account/profile. The stored information includes, for example, past trips, saved or frequently selected destinations (e.g., home, work), and user preferences. In some embodiments, the trip data is stored in or associated with the user profile corresponding to each user and includes a history of interactions using the network system 102. While the data storage 206 is shown to be embodied within the network system 102, alternative embodiments can locate the data storage 206 elsewhere and be communicatively coupled to the network system 102.

The copresence engine 208 is configured to manage copresence determination using multichannel copresence detection. In various embodiments, the copresence engine 208 collects scans from the user devices 106, performs an analysis on the scans, and based on the analysis, determines whether the user devices 106 are co-present (e.g., within a threshold distance). To enable these operations, the copresence engine 208 comprises a collection module 212, a vector module 214, and a similarity module 216.

The collection module 212 manages the collection of scans from the user devices 106. In some embodiments, the collection module 212 receives an indication of a trip requested by the first user of user device 106a to be serviced by the second user of user device 106b. Based on this indication, the collection module 212 can trigger the user devices 106 (e.g., via their respective client applications 108) to scan for signals in their environment 100. The scans can be triggered periodically until the user devices 106 are co-present or until the trip ends. In other embodiments, the request sent from the first user device 106a and acceptance to provide the transportation service by the second user device 106b can trigger (e.g., by the client application 108) the respective user devices 106 to periodically perform a scan. The scans are then transmitted to the collection module 212 (e.g., via the device interface 202). While example embodiments are discussed herein as determining co-presence of two user devices 106 based on scans from each user device 106, alternative embodiments can complete determining co-presence of more than two user devices.

Thus, the scans can be from the user devices 106 within a narrow time window, can be used over multiple time windows, or can be from multiple user devices 106 in multiple time windows. A main use case is two user devices 106 in a similar time window, although other embodiments are contemplated. Each scan can capture an arbitrary number of Wi-Fi, Bluetooth, cellular, ultra-wide band, and/or other detectable signals in an environment.

The vector module 214 manages defining a vector space and creating a vector for each scan. The vector module 214 defines the vector space with dimensionality equal to the number of unique device identifiers (e.g., beacons) across the two scans (e.g., one from each user device 106), which can be in a fixed order. It is noted that the order itself is unimportant. For example, if the user device 106a scans beacon1 110 and beacon2 112, while the user device 106b scans beacon1 110 and beacon3 114, then the vector space will be three based on the three unique device identifiers of the three beacons or signal broadcasting devices.

The vector module 214 generates a vector for each scan that comprises a Received Signal Strength Indicator (RSSI) for the corresponding user device 106 to each of the unique device identifiers in the vector space. Thus, the vector associated with the first user device 106a comprises a RSSI for the user device 106a to each of the beacons 110-114 identified from the two scans, and the similar applies to the second user device 106b. The RSSI is a standard methodology for measuring a beacon's signal as observed by the receiving device (e.g., the user device 106). RSSI ranges from −26 (strongest) to −100 (weakest). The vector module 214 constrains the RSSI range to [−100, 0]. If a beacon is not observed by one of the user devices 106, the value is indicated as −100. The vector module 214 then adds 100 to all entries of the vector to normalize to a range of 0-100. Thus, a beacon that is not detected by one of the user devices 106 has a value of 0.

As a result, the vector module 214 generates a vector for each user device 106 (e.g., user device 106a and user device 106b) whereby the elements of those vectors each represent the strength observed from each of the user devices 106 to each of the same signal broadcasting device or beacon. For example, index 0 in the vector on both the first user device 106*a* and second user device 106*b* scan is a strength observed from a first signal broadcasting device (e.g., beacon1 110). Index 1 is an observed strength by each user device 106 from a second signal broadcasting device (e.g., beacon2 112), and so forth. The vectors generated by the vector module 214 are represented as A (for the first user device 106*a*) and B (for the second user device 106*b*) in the equation discussed below.

The similarity module 216 manages determination of a probability that the user devices 106 are co-present. In example embodiments, the similarity module 216 uses a similarity function which produces the probability. In these embodiments, a similarity score is based on three factors: an angular similarity between the vectors, a magnitude similarity between the vectors, and a number of unique beacons observed in the two scans. A simple method for comparing vectors is cosine similarity, which essentially computes the angular similarity between the two vectors. Thus:

$$\text{Angular similarity: cosineSimilarity}(A, B) \quad (1)$$

Example embodiments go beyond simply using angular similarity by including magnitude similarity. Magnitudes represent the signal strengths. In various cases, multiple scans can have the same angular similarity, but very different magnitudes. In one embodiment, the magnitude similarity is a ratio of 1 and 1+ the absolute difference between the magnitudes of the vectors. Thus, if the sizes of these vectors are the same, then the absolute difference will be zero and the magnitude similarity will be 1. If A and B observe all the same scans but with very different magnitudes, then a very large difference between the magnitudes of these scans will be detected. Magnitude similarity approaches 0 as the difference of the magnitudes of the vectors approach 0. Thus, $$\text{Magnitude similarity}: 1 - \frac{|\|A\| - \|B\||}{\max(\|A\|, \|B\|)} \quad (2)$$

The third piece used by the similarity module 216 is the number of scans. Vectors can be very different in context and size. For example, in rural areas, there may be no signals or only one or two signals detected by the user devices 106. In some areas, it can be hundreds of signals. In one embodiment, the number of unique beacons observed in the two scans can be considered as follows:

$$\frac{1}{1 + e^{-k(s-m)}} \quad (3)$$

A product of the angular similarity and the magnitude similarity provides S in equation (3).

$$\text{cosineSimilarity}(A, B) \cdot \left(1 - \frac{|\|A\| - \|B\||}{\max(\|A\|, \|B\|)}\right)$$

In a unified form, the multichannel copresence estimation equation or function is, in accordance with one embodiment is:

$$\text{copresence}(A, B) = \frac{1}{1 + e^{-k\left(\text{cosineSimilarity}(A,B) \cdot \left(1 - \frac{|\|A\| - \|B\||}{\max(\|A\|, \|B\|)}\right) - m\right)}} \quad (4)$$

Figure 3:
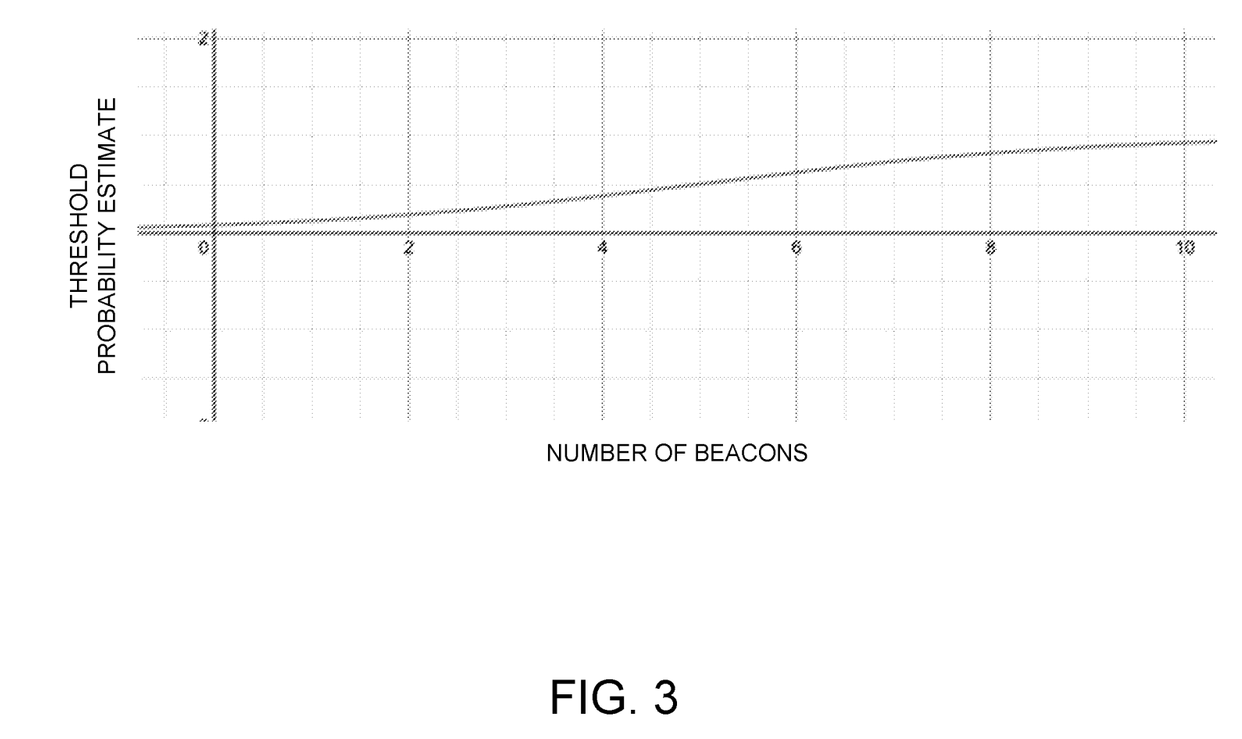
FIG. 3 is a plot illustrating a sample logistic function that can be used in accordance with some example embodiments.

Equation (4) has two tunable parameters, k and m. m is a midpoint of a logistic function (e.g., a sigmoid function). It is a tunable parameter to determine a relative confidence according to the number of beacons observed in each scan. At number of unique beacons=m, with perfectly equal beacon vector angles and magnitudes, the copresence estimation will equal 50% and can be adjusted based on the desired precision of the copresence estimation. An example logistic function that can be used is shown in FIG. 3. Note that, with m=5, the probability estimate is 0.5 when the number of beacons equals 5 as shown in FIG. 3.

k determines the steepness of the curve of the logistic function. In the context of this problem, k represents how quickly the network system 102 becomes confident of copresence, assuming equal scan vectors, as a function of the number of unique signal broadcasting devices used in calculating the vector similarity. For very large values of k, the copresence estimation will be close to zero until reaching m, and then will be close to one after m, assuming perfect vector similarity. For small values of k, the copresence will gradually increase as the number of unique beacons in the two scans increases. With more scans, the similarity module 216 is willing to accept a slightly lower magnitude and angular similarity and still be confident on copresence or colocation. Conversely, if there are fewer scans, the similarity module 216 needs a higher level of confidence from angular and magnitude similarity.

Copresence is a (confidence) probability between 0 and 1. At 1, the similarity module 216 is sure that the user devices 106 are together and at 0, the similarity module 216 has no confidence the user devices 106 are together. The more signals detected, the lower probability the similarity module 216 is willing to accept. The threshold is tunable. For example, 0.5 may be a good threshold to start.

Based on the probability determined by similarity module 216, the similarity module 216 can trigger one or more components of the network system 102 to perform a corresponding operation. In example embodiments, some of the components are those of the transport service engine 210. The transport service engine 210 is configured to manage and monitor transportation services. In example embodiments, the transport service engine 210 comprises a location module 218 and a trip module 220. The transport service engine 210 comprises other components not pertinent to example embodiments that are not shown. For instance, the transport service engine 210 may comprise components for establishing a trip based on a trip request, generating routes for trips, and monitoring navigation of the routes.

The location module 218 provides notifications regarding locations based on the probability determined by the similarity module 216. Based on a high probability of copresence, the location module 218 generates and transmits a notification (e.g., via the UI module 204) to the two user devices 106 indicating that the two user devices 106 are co-present relative to each other. For example, a notification can be provided to a rider that they have gotten in the correct vehicle of their driver. Conversely, the location module can generate and transmit visual feedback (e.g., a notification displayed on user interface) that the two user devices 106 are not co-present (e.g., notification to a rider that they are in the wrong vehicle) or provide visual feedback to first user (e.g., the rider) that they are getting closer or farther to their driver to facilitate pick up. This may be useful in dense urban areas, airports, stadiums, malls, or parking garages; in heavy vehicular or pedestrian traffic, or when GPS accuracy is low for one or both users. Similarly, the location module 218 can provide visual feedback to a courier that they are getting closer to their delivery location (e.g., in a large or complex building or location).

The trip module 220 monitors a trip and can be triggered by the similarity module 216 to start or stop a trip. For example, if the probability indicates that the two user devices become co-located, then the trip module 220 can automatically start a trip, note the start of the trip, or allow the trip to be started by the service provider (e.g., start billing for the transportation service). Conversely, if the probability indicates that the two user devices are no longer co-present after having been so during a trip, then the trip module 220 can automatically end a trip or note (e.g., in the data storage 206) that the trip has ended. Noting when a trip has started or ended can be used in situations where there may be a dispute between the rider and driver as to when a trip started or ended. For example, the rider may have gotten out of the vehicle but the driver did not end the trip on their client application 108 resulting in the rider still be charged for the transportation service, or vice-versa where the driver starts a trip (e.g., starts billing for his services) before picking up the rider. The stored trip start or end data can be used to settle disputes in situations such as these.

Figure 4:
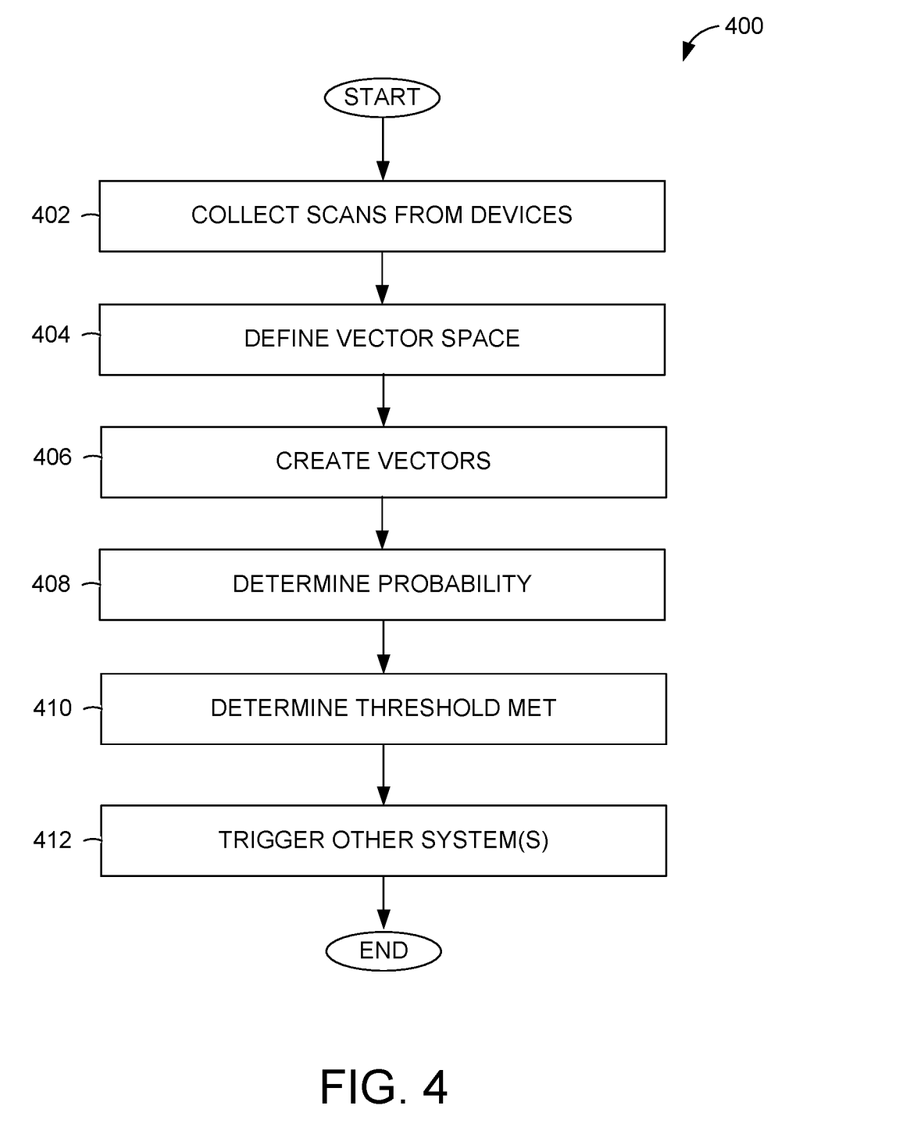
FIG. 4 is a flowchart illustrating operations of a method for providing high dimension copresence estimation, according to some example embodiments.

FIG. 4 is a flowchart illustrating operations of a method 400 for providing high dimension copresence estimation, according to some example embodiments. Operations in the method 400 may be performed by the network system 102, using components described above with respect to FIG. 2. Accordingly, the method 400 is described by way of example with reference to the network system 102. However, it shall be appreciated that at least some of the operations of the method 400 may be deployed on various other hardware configurations or be performed by similar components residing elsewhere in the network environment 100. Therefore, the method 400 is not intended to be limited to the network system 102.

In operation 402, the collection module 212 collect scans from the user devices 106. In some embodiments, the collection module 212 triggers the user devices 106 to scan for signals in their environment 100. The scans can be triggered periodically until the user devices are co-present or until the trip ends. In other embodiments, the first user device 106a and the second user device 106b can trigger themselves (e.g., by their respective client application 108) to periodically perform a scan once they have agreed to a trip. Each scan can capture an arbitrary number of Wi-Fi, Bluetooth, cellular, ultra-wide band, or other types of signals. The scans are then transmitted to the collection module 212 (e.g., via the device interface 202).

In operation 404, the vector module 214 defines a vector space based on the collected scans. The vector space is defined with a dimensionality equal to the number of unique device identifiers or unique beacons detected in the scans collected in operation 402.

In operation 406, the vector module 214 create vectors from each scan that comprises a RSSI for the corresponding user device 106 to each of the unique device identifiers in the vector space. The vector module 214 constrains the RSSI range to [−100, 0]. The vector module 214 then adds 100 to all entries of the vector to normalize to a range of 0-100. As a result, the vector module 214 generates a vector for each user device 106 (e.g., user device 106a and user device 106b) whereby the elements of those vectors each represent the strength observed from each of the user devices 106 to each of the same signal broadcasting device or beacon.

In operation 408, the similarity module 216 determines a probability that the user devices 106 are co-present. In example embodiments, the similarity module 216 uses a similarity function which produces the probability based on three factors: an angular similarity between the vectors, a magnitude similarity between the vectors, and a number of unique beacons observed in the two scans. The vectors are applied to the similarity function.

In operation 410, the similarity module 216 determines whether a threshold is met that would indicate that the user devices 106 are co-present. Copresence is a (confidence) probability between 0 and 1. At 1, the similarity module 216 is completely confident that the user devices 106 are together and at 0, the similarity module 216 has no confidence the user devices 106 are together. In one embodiment, the threshold is 0.5. However, the more signals detected, the lower probability the similarity module 216 may be willing to accept (e.g., a lower threshold). Thus, the threshold is tunable.

In operation 412, the similarity module 216 triggers other systems based on the probability and threshold. For instance, based on a high probability of copresence (e.g., threshold met or exceeded), the similarity module 216 may trigger the location module 218 to generate and transmit a notification indicating that the user devices 106 are co-present relative to each other. Similarly, the location module 218 can provide visual feedback to a courier that they are have arrived at their delivery location when the threshold is met or exceed. Conversely, if the threshold is not met, then the similarity module 216 may trigger the location module 218 to generate and transmit a notification that the user devices 106 are not co-present or to provide visual feedback to first user (e.g., the rider) that they are getting closer or farther to their driver.

The similarity module 216 can also trigger the trip module 220 to record a start of a trip or an end of a trip. For example, if the threshold is met or exceeded, the similarity module 216 provides this indication and the trip module 220 can automatically start a trip or allow a trip to be started. Conversely, if the probability does not meet the threshold, then similarity module 216 provides an indication that the users are not co-located and the trip module 220 can automatically end a trip or record (e.g., in the data storage 206) that the trip has ended.

Figure 5:
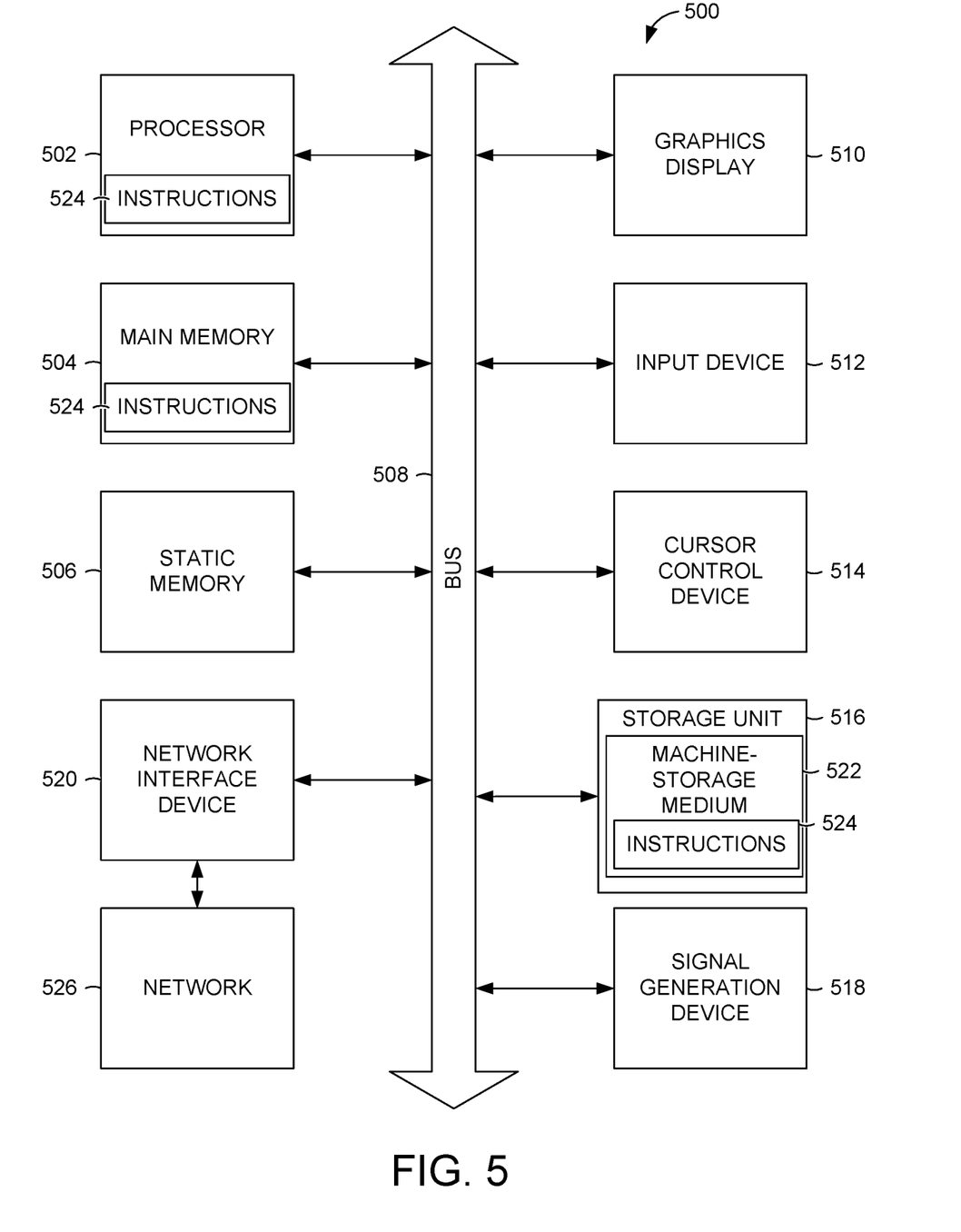
FIG. 5 is a block diagram illustrating components of a machine, according to some example embodiments, able to read instructions from a machine-storage medium and perform any one or more of the methodologies discussed herein.

FIG. 5 illustrates components of a machine 500, according to some example embodiments, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 5 shows a diagrammatic representation of the machine 500 in the example form of a computer device (e.g., a computer) and within which instructions 524 (e.g., software, a program, an application, an applet, an app, or other executable code) for causing the machine 500 to perform any one or more of the methodologies discussed herein may be executed, in whole or in part.

For example, the instructions 524 may cause the machine 500 to execute the flow diagrams of FIG. 4. In one embodiment, the instructions 524 can transform the general, non-programmed machine 500 into a particular machine (e.g., specially configured machine) programmed to carry out the described and illustrated functions in the manner described.

In alternative embodiments, the machine 500 operates as a standalone device or may be connected (e.g., networked) to other machines. In a networked deployment, the machine 500 may operate in the capacity of a server machine or a client machine in a server-client network environment, or as a peer machine in a peer-to-peer (or distributed) network environment. The machine 500 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 524 (sequentially or otherwise) that specify actions to be taken by that machine. Further, while only a single machine is illustrated, the term "machine" shall also be taken to include a collection of machines that individually or jointly execute the instructions 524 to perform any one or more of the methodologies discussed herein.

The machine 500 includes a processor 502 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 504, and a static memory 506, which are configured to communicate with each other via a bus 508. The processor 502 may contain microcircuits that are configurable, temporarily or permanently, by some or all of the instructions 524 such that the processor 502 is configurable to perform any one or more of the methodologies described herein, in whole or in part. For example, a set of one or more microcircuits of the processor 502 may be configurable to execute one or more modules (e.g., software modules) described herein.

The machine 500 may further include a graphics display 510 (e.g., a plasma display panel (PDP), a light emitting diode (LED) display, a liquid crystal display (LCD), a projector, or a cathode ray tube (CRT), or any other display capable of displaying graphics or video). The machine 500 may also include an input device 512 (e.g., a keyboard), a cursor control device 514 (e.g., a mouse, a touchpad, a trackball, a joystick, a motion sensor, or other pointing instrument), a storage unit 516, a signal generation device 518 (e.g., a sound card, an amplifier, a speaker, a headphone jack, or any suitable combination thereof), and a network interface device 520.

The storage unit 516 includes a machine-storage medium 522 (e.g., a tangible machine-storage medium) on which is stored the instructions 524 (e.g., software) embodying any one or more of the methodologies or functions described herein. The instructions 524 may also reside, completely or at least partially, within the main memory 504, within the processor 502 (e.g., within the processor's cache memory), or both, before or during execution thereof by the machine 500. Accordingly, the main memory 504 and the processor 502 may be considered as machine-readable media (e.g., tangible and non-transitory machine-readable media). The instructions 524 may be transmitted or received over a network 526 via the network interface device 520.

In some example embodiments, the machine 500 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 504, 506, and/or memory of the processor(s) 502) and/or storage unit 516 may store one or more sets of instructions and data structures (e.g., software) 524 embodying or utilized by any one or more of the methodologies or functions described herein. These instructions, when executed by processor(s) 502 cause various operations to implement the disclosed embodiments.

As used herein, the terms "machine-storage medium," "device-storage medium," "computer-storage medium" (referred to collectively as "machine-storage medium 522") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 522 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 522 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 524 may further be transmitted or received over a communications network 526 using a transmission medium via the network interface device 520 and utilizing any one of a number of well-known transfer protocols (e.g., HTTP). Examples of communication networks 526 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 524 for execution by the machine 500, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Examples

Example 1 is a method for providing high dimension copresence estimation. The method comprises receiving, from each of a plurality of client devices by the network system, a transmission of a scan of signals detected from signal broadcasting devices; creating, by one or more hardware processors of the network system, a vector from each scan, the vector comprising a received signal strength indicator (RSSI) to each unique signal broadcasting device; based on the vector created from each scan, determining, by the network system, a probability that the client devices are co-present, the probability being based on both angular similarity and magnitude similarity; and based on the probability, triggering a component of the network system to perform a corresponding operation.

In example 2, the subject matter of example 1 can optionally include triggering, by the network system, the client devices to scan for the signals from the signal broadcasting devices.

In example 3, the subject matter of any of examples 1-2 can optionally include defining a vector space with dimensionality equal to a number of the signal broadcasting devices across the scans from the plurality of client devices, each vector being generated based on the vector space.

In example 4, the subject matter of any of examples 1-3 can optionally include wherein the signal broadcasting devices comprise one or more of a Wi-Fi base station; a Bluetooth device; a cellular network tower; or an ultra-wide band emitting device.

In example 5, the subject matter of any of examples 1-4 can optionally include wherein determining the probability comprises determining the angular similarity; determining the magnitude similarity; determining a number of signal broadcasting devices observed in the scans from the user devices; and applying the vectors to a copresence estimation function that uses the angular similarity, the magnitude similarity, and the number of signal broadcasting devices.

In example 6, the subject matter of any of examples 1-5 can optionally include wherein triggering the component of the network system to perform the corresponding operation comprises causing transmission of a notification, to one or more of the user devices, indicating that the user devices are not co-present relative to each other based on the probability indicating that the client devices are not co-present.

In example 7, the subject matter of any of examples 1-6 can optionally include wherein triggering the component of the network system to perform the corresponding operation comprises recording a start of a trip based on the probability indicating that the client devices are co-present, the trip comprising a transportation service provided to a first user of one of the user devices by a second user of another of the user devices.

In example 8, the subject matter of any of examples 1-7 can optionally include wherein triggering the component of the network system to perform the corresponding operation comprises recording an end of a trip based on the probability indicating that the client devices are no longer co-present, the trip comprising a transportation service provided to a first user of one of the user devices by a second user of another of the user devices.

Example 9 is a system for providing high dimension copresence estimation. The system includes one or more processors and a memory storing instructions that, when executed by the one or more hardware processors, causes the one or more hardware processors to perform operations comprising receiving, from each of a plurality of client devices, a transmission of a scan of signals from signal broadcasting devices; creating a vector from each scan, the vector comprising a received signal strength indicator (RSSI) to each unique signal broadcasting device; based on the vector created from each scan, determining a probability that the client devices are co-present, the probability being based on both angular similarity and magnitude similarity; and based on the probability, triggering a component to perform a corresponding operation.

In example 10, the subject matter of example 9 can optionally include triggering the client devices to scan for the signals from the signal broadcasting devices.

In example 11, the subject matter of any of examples 9-10 can optionally include defining a vector space with dimensionality equal to a number of the signal broadcasting devices across the scans from the plurality of client devices, each vector being generated based on the vector space.

In example 12, the subject matter of any of examples 9-11 can optionally include wherein the signal broadcasting devices comprise one or more of a Wi-Fi base station; a Bluetooth device; a cellular network tower; or an ultra-wide band emitting device.

In example 13, the subject matter of any of examples 9-12 can optionally include wherein determining the probability comprises determining the angular similarity; determining the magnitude similarity; determining a number of signal broadcasting devices observed in the scans from the user devices; and applying the vectors to a copresence estimation function that uses the angular similarity, the magnitude similarity, and the number of signal broadcasting devices.

In example 14, the subject matter of any of examples 9-13 can optionally include wherein triggering the component of the network system to perform the corresponding operation comprises causing transmission of a notification, to one or more of the user devices, indicating that the user devices are not co-present relative to each other based on the probability indicating that the client devices are not co-present.

In example 15, the subject matter of any of examples 9-14 can optionally include wherein triggering the component of the network system to perform the corresponding operation comprises recording a start of a trip based on the probability indicating that the client devices are co-present, the trip comprising a transportation service provided to a first user of one of the user devices by a second user of another of the user devices.

In example 16, the subject matter of any of examples 9-15 can optionally include wherein triggering the component of the network system to perform the corresponding operation comprises recording an end of a trip based on the probability indicating that the client devices are no longer co-present, the trip comprising a transportation service provided to a first user of one of the user devices by a second user of another of the user devices.

Example 17 is a machine-storage medium storing instructions for providing high dimension copresence estimation. The machine-storage medium configures one or more processors to perform operations comprising receiving, from each of a plurality of client devices, a transmission of a scan of signals from signal broadcasting devices; creating a vector from each scan, the vector comprising a received signal strength indicator (RSSI) to each unique signal broadcasting device; based on the vector created from each scan, determining a probability that the client devices are co-present, the probability being based on both angular similarity and magnitude similarity; and based on the probability, triggering a component to perform a corresponding operation.

In example 18, the subject matter of example 17 can optionally include triggering the client devices to scan for the signals from the signal broadcasting devices.

In example 19, the subject matter of any of examples 17-18 can optionally include defining a vector space with dimensionality equal to a number of the signal broadcasting devices across the scans from the plurality of client devices, each vector being generated based on the vector space.

In example 20, the subject matter of any of examples 17-19 can optionally include wherein determining the probability comprises determining the angular similarity; determining the magnitude similarity; determining a number of signal broadcasting devices observed in the scans from the user devices; and applying the vectors to a copresence estimation function that uses the angular similarity, the magnitude similarity, and the number of signal broadcasting devices.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
   receiving, from each of a plurality of client devices by the network system, a transmission of a scan of signals detected from signal broadcasting devices;
   creating, by one or more hardware processors of the network system, a vector from each scan, the vector comprising a received signal strength indicator (RSSI) to each unique signal broadcasting device;
   based on the vector created from each scan, determining, by the network system, a probability that the client devices are co-present, the probability being based on both angular similarity and magnitude similarity; and
   causing transmission of a notification, to one or more of the user devices, indicating that the user devices are not co-present relative to each other based on the probability indicating that the client devices are not co-present.

2. The method of claim 1, further comprising:
   triggering, by the network system, the client devices to scan for the signals from the signal broadcasting devices.

3. The method of claim 1, further comprising:
   defining a vector space with dimensionality equal to a number of the signal broadcasting devices across the scans from the plurality of client devices, each vector being generated based on the vector space.

4. The method of claim 1, wherein the signal broadcasting devices comprise one or more of:
   a Wi-Fi base station;
   a Bluetooth device;
   a cellular network tower; or
   an ultra-wide band emitting device.

5. The method of claim 1, wherein determining the probability comprises:
   determining the angular similarity;
   determining the magnitude similarity;
   determining a number of signal broadcasting devices observed in the scans from the user devices; and
   applying the vectors to a copresence estimation function that uses the angular similarity, the magnitude similarity, and the number of signal broadcasting devices.

6. A system comprising:
   one or more hardware processors; and
   a storage medium storing instructions that, when executed by the one or more hardware processors, cause the one or more hardware processors to perform operations comprising:
      receiving, from each of a plurality of client devices, a transmission of a scan of signals from signal broadcasting devices;
      creating a vector from each scan, the vector comprising a received signal strength indicator (RSSI) to each unique signal broadcasting device;

based on the vector created from each scan, determining a probability that the client devices are co-present, the probability being based on both angular similarity and magnitude similarity; and recording a start of a trip based on the probability indicating that the client devices are co-present, the trip comprising a transportation service provided to a first user of one of the user devices by a second user of another of the user devices.

7. The system of claim 6, wherein the operations further comprise:

triggering the client devices to scan for the signals from the signal broadcasting devices.

8. The system of claim 6, wherein the operations further comprise:

defining a vector space with dimensionality equal to a number of the signal broadcasting devices across the scans from the plurality of client devices, each vector being generated based on the vector space.

9. The system of claim 6, wherein the signal broadcasting devices comprise one or more of:

a Wi-Fi base station;
a Bluetooth device;
a cellular network tower; or
an ultra-wide band emitting device.

10. The system of claim 6, wherein determining the probability comprises:

determining the angular similarity;
determining the magnitude similarity;
determining a number of signal broadcasting devices observed in the scans from the user devices; and
applying the vectors to a copresence estimation function that uses the angular similarity, the magnitude similarity, and the number of signal broadcasting devices.

11. The system of claim 6, wherein the operation comprises:

recording an end of the trip based on the probability indicating that the client devices are no longer co-present.

12. A method comprising:

receiving, from each of a plurality of client devices, a transmission of a scan of signals from signal broadcasting devices;

creating a vector from each scan, the vector comprising a received signal strength indicator (RSSI) to each unique signal broadcasting device;

based on the vector created from each scan, determining a probability that the client devices are co-present, the probability being based on both angular similarity and magnitude similarity; and recording an end of a trip based on the probability indicating that the client devices are no longer co-present, the trip comprising a transportation service provided to a first user of one of the user devices by a second user of another of the user devices.

13. The method of claim 12, further comprising:

triggering the client devices to scan for the signals from the signal broadcasting devices.

14. The method of claim 12, further comprising:

defining a vector space with dimensionality equal to a number of the signal broadcasting devices across the scans from the plurality of client devices, each vector being generated based on the vector space.

15. The method of claim 12, wherein determining the probability comprises:

determining the angular similarity;
determining the magnitude similarity;
determining a number of signal broadcasting devices observed in the scans from the user devices; and
applying the vectors to a copresence estimation function that uses the angular similarity, the magnitude similarity, and the number of signal broadcasting devices.

16. The method of claim 12, wherein the signal broadcasting devices comprise one or more of:

a Wi-Fi base station;
a Bluetooth device;
a cellular network tower; or
an ultra-wide band emitting device.

* * * * *